United States Patent [19]
Lipo et al.

[11] Patent Number: 5,455,473
[45] Date of Patent: Oct. 3, 1995

[54] FIELD WEAKENING FOR A DOUBLY SALIENT MOTOR WITH STATOR PERMANENT MAGNETS

[75] Inventors: Thomas A. Lipo; Yuefeng Liao; Feng Liang, all of Madison, Wis.

[73] Assignee: Electric Power Research Institute, Inc., Palo Alto, Calif.

[21] Appl. No.: 17,833

[22] Filed: Feb. 16, 1993

Related U.S. Application Data

[63] Continuation-in-part of Ser. No. 926,765, Aug. 6, 1992, abandoned, which is a continuation-in-part of Ser. No. 881,202, May 11, 1992, Pat. No. 5,304,882.

[51] Int. Cl.[6] ............................................. H02K 16/00
[52] U.S. Cl. .................... 310/114; 310/115; 310/118; 310/154; 310/254; 310/269
[58] Field of Search .......................... 310/114, 115, 310/116, 117, 118, 119, 120, 190, 191, 209, 181, 269, 120, 154, 156, 152, 266, 254, 261; 318/701

[56] References Cited

U.S. PATENT DOCUMENTS

| | | | |
|---|---|---|---|
| 2,539,569 | 1/1951 | Clark | 171/212 |
| 2,816,240 | 12/1957 | Zimmerman | 310/155 |
| 3,408,556 | 10/1968 | Gabor | 310/269 |
| 3,484,635 | 12/1969 | MacKallor, Jr. | 310/156 |
| 3,616,761 | 11/1971 | Valls | 104/148 R |
| 3,783,502 | 1/1974 | Richter et al. | 29/598 |
| 3,862,445 | 1/1975 | Volkrodt | 310/154 |
| 3,984,711 | 10/1976 | Kordick | 310/49 R |
| 4,011,479 | 3/1977 | Volkrodt | 310/154 |
| 4,081,703 | 3/1978 | Madsen et al. | 310/49 R |
| 4,097,754 | 6/1978 | Farr | 310/67 R |
| 4,110,646 | 8/1978 | Rao | 310/163 |
| 4,348,605 | 9/1982 | Torok | 310/168 |
| 4,472,651 | 9/1984 | Jones | 310/156 |
| 4,629,921 | 12/1986 | Gavaletz | 310/156 |
| 4,631,510 | 12/1986 | Nagarkatti et al. | 336/135 |
| 4,712,028 | 12/1987 | Horber | 310/49 R |
| 4,731,554 | 3/1988 | Hall | 310/266 |
| 4,733,117 | 3/1988 | Perrins | 310/162 |
| 4,752,707 | 6/1988 | Morrill | 310/184 |
| 4,827,164 | 5/1989 | Horber | 310/49 R |
| 4,896,088 | 1/1990 | Jahns | 318/107 |
| 4,916,346 | 4/1990 | Kliman | 310/216 |
| 4,939,398 | 7/1990 | Lloyd | 310/156 |
| 4,972,112 | 11/1990 | Kim | 310/154 |
| 5,004,944 | 4/1991 | Fisher | 310/266 |
| 5,051,640 | 9/1991 | Freise | 310/162 |
| 5,059,884 | 10/1991 | Shah et al. | 318/701 |
| 5,097,190 | 3/1992 | Lyons | 318/701 |
| 5,117,144 | 5/1992 | Torok | 310/269 |
| 5,124,606 | 6/1992 | Eisenbeis | 310/114 |
| 5,148,090 | 9/1992 | Oku | 318/107 |
| 5,304,882 | 4/1994 | Lipo et al. | 310/156 |

FOREIGN PATENT DOCUMENTS 2548798  6/1976  Germany .............................. 310/266

*Primary Examiner*—R. Skudy
*Attorney, Agent, or Firm*—Leonard Bloom

[57] ABSTRACT

A device for field weakening in a doubly-salient variable reluctance motor having permanent magnets in the stator. The field weakening increases the constant power range of the motor and is accomplished by controlled movement of steel insets toward and away from the sides of the stator proximate the permanent magnets to provide a controllable by-pass flux path thereabout. Alternatively, the field weakening may be accomplished by a flux by-pass collar which may be angularly positioned around the stator to bridge the permanent magnets of the motor with discrete magnetic sections, thereby providing an alternate by-pass flux path around the permanent magnets in addition to the main air gap flux path. A third alternative means for maintaining a constant power range is accomplished by controlled axial sliding of the permanent magnets themselves into and out from the stator.

7 Claims, 3 Drawing Sheets

FIELD WEAKENING FOR A DOUBLY SALIENT MOTOR WITH STATOR PERMANENT MAGNETS

CROSS-REFERENCE TO RELATED APPLICATIONS

The present application is a continuation-in-part of U.S. patent application Ser. No. 07/926,765, filed Aug. 6, 1992, now abandoned, which is a continuation-in-part of U.S. patent application Ser. No. 881,202, filed May 11, 1992, now U.S. Pat. No. 5,304,882.

BACKGROUND OF THE INVENTION

1. Field of the Invention

The present invention relates to high-output permanent magnet motors incorporating a doubly salient structure with stationary permanent magnets in the stator and, more particularly, to field weakening via controlled movement of steel insets toward/against the sides of the stator near the permanent magnets to provide a controllable by-pass flux path thereabout. Appropriate control broadens the constant power range of the motor.

2. Description of the Background

In a variable reluctance motor (VRM), torque is generated by a doubly-salient rotor and stator which tend to align themselves in order to reach a position of minimum magnetic reluctance. Under ideal switching conditions, VRMs have the potential to be highly efficient. Unfortunately, actual switching conditions are less than ideal, and attempts to achieve such conditions have resulted in commercially impractical converter circuits with excessive voltage and current stresses imparted to the switching devices. In a drive utilizing a variable reluctance motor, the current in each phase should be decreased to zero immediately when the rotor is aligned with that phase. The problem lies in the existence of a large turn-off inductance. The phase inductance is a maximum when the rotor is aligned with that phase. Since this large inductance will prevent rapid decrease of the current due to the energy stored in the magnetic field, the current in each phase cannot immediately be decreased to zero when the rotor reaches alignment. Consequently, the decaying residual current induces a detrimental reverse-torque as the rotor pole surpasses alignment with the corresponding stator pole. The problem is most serious when the speed of the motor is high.

One solution to the above-described problem was provided in U.S. patent application Ser. No. 07/926,765, filed Aug. 6, 1992. A new type of permanent magnet motor was therein disclosed which incorporated a doubly salient structure with stationary permanent magnets in the stator.

FIG. 1 shows a cross-section of a doubly salient stationary permanent magnet motor (DS²PM) as set forth in U.S. patent application Ser. No. 07/926,765, filed Aug. 6, 1992.

A stator 10 consists of a plurality of discrete laminated layers, each layer being punched to form six salient (or projecting) poles 12 positioned at angular intervals $\theta_s$ of $\pi/3$ radians. Each pole 12 has a pole arc $\theta_{ps}$ of $\pi/6$ radians.

The rotor 16 also consists of a plurality of discrete laminated layers each of which is punched to form four salient poles 18 positioned at angular intervals $\theta_r$ of $\pi/2$. Each pole 18 also has a pole arc $\theta_{pr}$ equal to or slightly greater than $\pi/6$ radians.

In the DS²PM embodiment of FIG. 1, stator 10 is wound with three short pitch windings corresponding to three phases A-C. Each short pitch winding (for example, the winding of phase A) further comprises two short pitch coils $A_{1-2}$ connected in series, and the coils $A_1$ and $A_2$ of each winding are wound around a diametrically opposite pair of stator poles 12.

In addition, two permanent magnets 22 and 24 are embedded inside the stator 10. The inclusion of permanent magnets 22 and 24 in the stator 10 rather than the rotor 16 has distinct advantages in that the motor is able to run at higher speed, the motor may be manufactured at a lower manufacturing cost, and the motor lends itself to better field weakening operation performance.

The permanent magnets 22 and 24 themselves generate the primary flux, and a secondary (armature reaction) flux is induced by the stator pole windings A-C. Due to their air-like permeability, permanent magnets 22 and 24 present a very high bi-planar reluctance which blocks the ordinary path of the secondary flux through the stator 10.

The particular stator pole 12 and rotor pole 18 arrangement of the present invention ensures that the total overlapped pole area remains constant for all positions of rotor 16. This way, the total air-gap reluctance (which is the primary reluctance for the permanent magnet excitation) is invariant to rotor 16 displacement $\theta_d$, and there exists a substantially linear transfer of permanent magnet flux between adjacent stator poles 12 during rotation of rotor 16. Consequently, permanent magnets 22 and 24 produce no cogging torque at no load.

Since torque is produced as a result of the change of flux linkage in the active stator winding(s) A-C, there is a reaction torque component caused by the interaction of stator winding current and the permanent magnet flux, and this reaction torque is the dominant driving torque of the motor. There is also a reluctance torque component caused by the variation in the reluctance of the magnetic path of the winding A-C. Hence, the DP²VRM works on the variable reluctance principle as well as permanent magnet brushless DC motor principles.

Insofar as the reaction torque component, FIG. 2 shows the variations of the currents i and the corresponding flux linkages λ in each phase resulting from the permanent magnets 22 and 24. Positive current is injected into a given phase when the magnetic flux linking that phase is increasing, and negative current is injected when the magnetic flux is decreasing. Consequently, a positive reaction torque component can be produced over the entire area of overlap of an active stator pole 12 and rotor pole 18 pair.

Insofar as the reluctance torque component, the reluctance torque $\tau_{er}$ in the respective phases will be of zero average if the amplitudes of the positive and negative pulses of the corresponding phase currents are kept constant and equal to each other by means of pulse width modulation of the associated power converter. In addition, the instant of reversal of the currents $i_a$, $i_b$, and $i_c$ applied to the stator windings must be kept centered about the peak of the triangle-shaped flux-linkage variations $\lambda_a$, $\lambda_b$, and $\lambda_c$ as shown in FIG. 2.

Under high speed operation, the associated power converter is no longer capable of maintaining the current amplitudes of the positive and negative pulses constant by means of pulse width modulation. In this case, the voltage applied to the motor of FIG. 1 will be simple positive and then negative rectangular pulses over the instants when the desired current should be positive and negative. This is single pulse operation.

Given that the DS²VRM will be powered by conventional single pulse operation at high speed, the phase currents will no longer be constant amplitude pulses at high speed. Consequently, the current will peak in the first half stroke where the inductance is increasing and will drop rapidly during the second half stroke where the inductance is decreasing. The uneven distribution of the uneven distribution of the phase current will give rise to net reluctance torque which can be used to extend the constant horsepower speed range. The presence of reluctance torque in addition to reaction torque markedly enhances the torque production during this mode of operation. Consequently, the constant power range can be extended compared to more conventional permanent magnet machines.

The present application proposes an efficient method and apparatus for accomplishing the above-described field weakening at all speeds of the motor.

SUMMARY OF THE INVENTION

It is an object of the present invention to increase the constant power range of the Stationary Permanent Magnet VRM as set forth in U.S. patent application Ser. No. 07/926,765, now abandoned by field weakening.

It is another object of the present invention to provide a method and apparatus for field weakening in a doubly salient VRM structure with stationary permanent magnets in the stator via controlled radial, axial, or circumferential movement of the permanent magnets or of steel insets which provide a by-pass flux path around the respective permanent magnets.

According to the present invention, the above-described and other objects are accomplished by providing a doubly-salient permanent magnet motor with stationary permanent magnets (i.e., a "DS$^2$PM" motor) and field weakening feature. The DS$^2$PM comprises a rotor having a multiple of four salient poles spaced at equal angular intervals around a central axis. The motor also includes a stator having a multiple of six salient poles spaced at equal angular intervals and three stator windings corresponding to three phase A-C. Each stator winding is coiled around pairs of diametrically opposite stator poles, for example, in the 6/4 stator/rotor pole embodiment each stator winding is coiled around one pair of diametrically opposite stator poles, in the 12/8 stator/rotor pole embodiment each stator winding is coiled around two pair of diametrically opposite stator poles, etc.

The stator further comprises a plurality of planar permanent magnets located on opposing sides of the stator to serve as a means for producing magnetizing flux.

The permanent magnets are preferably shaped in parallelepipeds and are arranged on diametrically opposite sides of the stator to serve as a source of flux for magnetizing the reluctance motor.

The field weakening feature is accomplished by an assembly which provides a variable-reluctance flux path around each of the permanent magnets. The field weakening assembly further includes an actuator for imparting controlled axial or radial movement and a steel inset conforming to a side of the stator and coupled to the actuator. The inset may be selectively driven by the actuator against/away from the stator to provide a controlled bypass flux path around one of the permanent magnets. The field weakening assembly may be controlled in accordance with the torque requirements to drive the steel inset toward the stator, thereby promoting the flow of flux around the permanent magnet and reducing the permanent magnetic flux-linkage of the stator windings. Conversely, the field weakening assembly may be controlled to retract the steel inset from the stator, thereby impeding the flow of flux around the permanent magnet and enhancing the permanent magnetic field.

An alternative field weakening feature is accomplished by an assembly which likewise provides a variable-reluctance flux path around each of the permanent magnets. This field weakening assembly further includes a rotating bypass collar which encircles the stator. The bypass collar is comprised of discrete alternating magnetic/non-magnetic arcuate sections. An actuator (such as a stepping motor) incrementally rotates the bypass collar about the stator to control the alignment of the discrete arcuate sections with the permanent magnets in the stator. The collar can be rotated until the discrete magnetic sections bridge the permanent magnets, thereby providing a controlled bypass flux path around the permanent magnets. Conversely, the collar can be rotated until the discrete non-magnetic sections bridge the permanent magnets, thereby blocking any flux path around the permanent magnets. The discrete magnetic/non-magnetic sections of the collar may be formed with a helical slant such that rotation of the collar around the stator effects a gradual alteration of the bypass flux path, thereby allowing full control over the entire range of possible permanent magnetic flux-linkages of the stator windings.

A third alternative field weakening feature is accomplished by an assembly which moves the permanent magnets themselves out of the stator to reduce the reluctance torque component. This field weakening assembly further includes an actuator for controlled axial extraction/insertion of the permanent magnets out of/into the stator. The permanent magnets may be selectively driven by the actuator in accordance with the torque requirements to control the magnitude of the reluctance torque component generated by the permanent magnets.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENT

Figure 1:
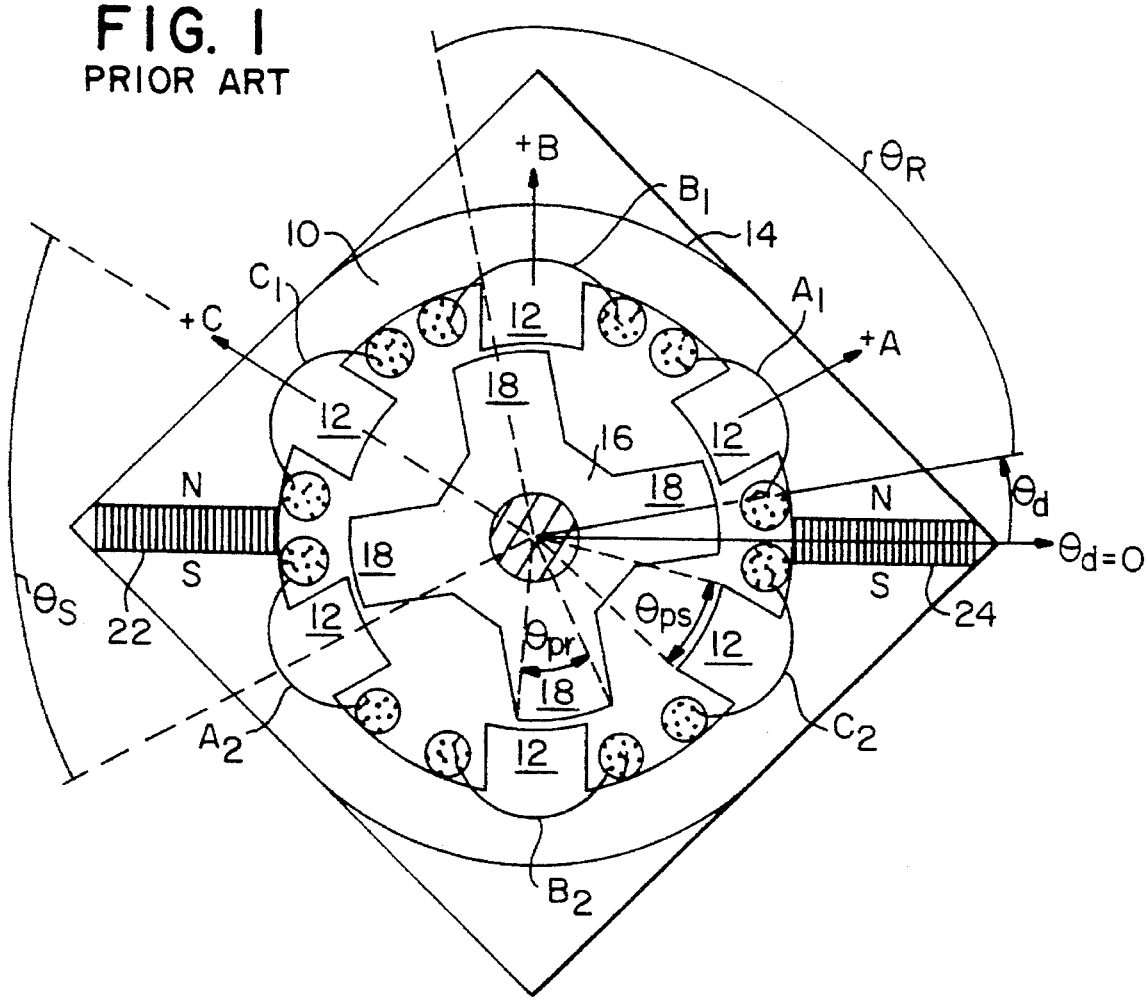
FIG. 1 shows a cross-section of a doubly salient stationary permanent magnet motor as set forth in U.S. patent application Ser. No. 07/926,765, filed Aug. 6, 1992, now abandoned.
Figure 2:
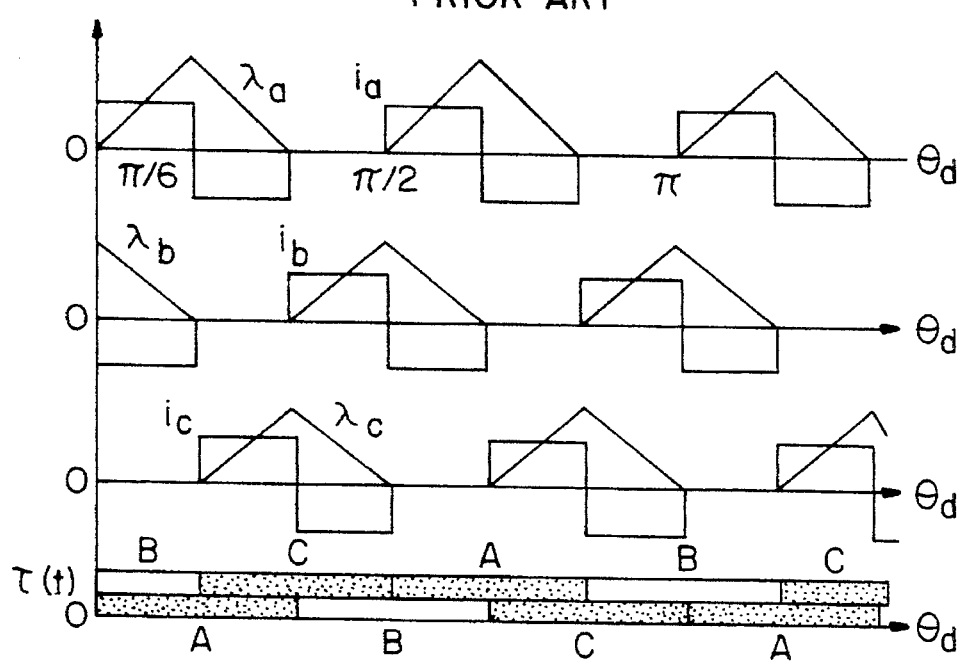
FIG. 2 is a graph of the currents $i_{a-c}$ and the corresponding flux linkages $\lambda_{a-c}$ in each of the respective phases A-C resulting from the permanent magnets 22 and 24 in the motor of FIG. 1.

The DS$^2$PM of FIG. 1 operates on the variable reluctance principle as well as permanent magnet brushless DC motor principles. Specifically, the permanent magnets 22 and 24 themselves generate a first (air gap) flux component, while a second (armature reaction) flux component is contributed by the stator pole windings A-C. The reluctance torque $\tau_{er}$ in the respective phases will be of zero average if the corresponding phase currents are taken on the quasi-square wave waveform shown in FIG. 2. This is due to the fact that the triangle-shaped flux-linkage variations $\lambda_a$, $\lambda_b$, and $\lambda_c$ resulting from flux emanating from the magnets 22 and 24 and couple to the three stator windings A-C produce quasi-square EMFs in the windings (the EMFs being the time derivative of the flux linkages). The sum of the products of the EMFs times the respective currents in each phase is well-known to result in the power output. When the stator currents are themselves quasi-square waves (same waveform as the EMFs), the sum of the product of the EMFs times the respective currents in each phase results in a constant torque. Hence, the reaction torque component generated by the interaction of the stator current with the magnetic flux linkage in each phase from the permanent magnet is the dominant torque producing component. However, due to their air-like permeability, permanent magnets 22 and 24 present a very high bi-planar reluctance which blocks the ordinary path of the armature reaction flux through the stator 10 at pole alignment. Hence, the stator windings meet a very small permeance (high reluctance) at both aligned and unaligned positions. Therefore, the inductance is correspondingly small at these positions so that only a short commutation period is necessary for turn-off of each outgoing phase and turn-on of the incoming phase.

As described above, the DS²PM is generally powered by conventional single pulse operation at high speed and by pulse width modulation (PWM) at low speeds. At high speeds, the phase currents will not remain constant. Consequently, the motor will pick up a net reluctance torque. The presence of reluctance torque in addition to reaction torque enhances the overall torque production during high speed operation. There are many known applications for permanent magnet motors wherein the torque must be maintained constant, and the changing torque characteristics in the DS²PM presents a problem.

Field weakening is an effective technique for broadening the constant power range of a motor at speeds above the point where the power supply (in this case, a solid state power converter) reaches its maximum voltage in an effort to control the quasi-rectangular current waveform of FIG. 1.

Figure 3:
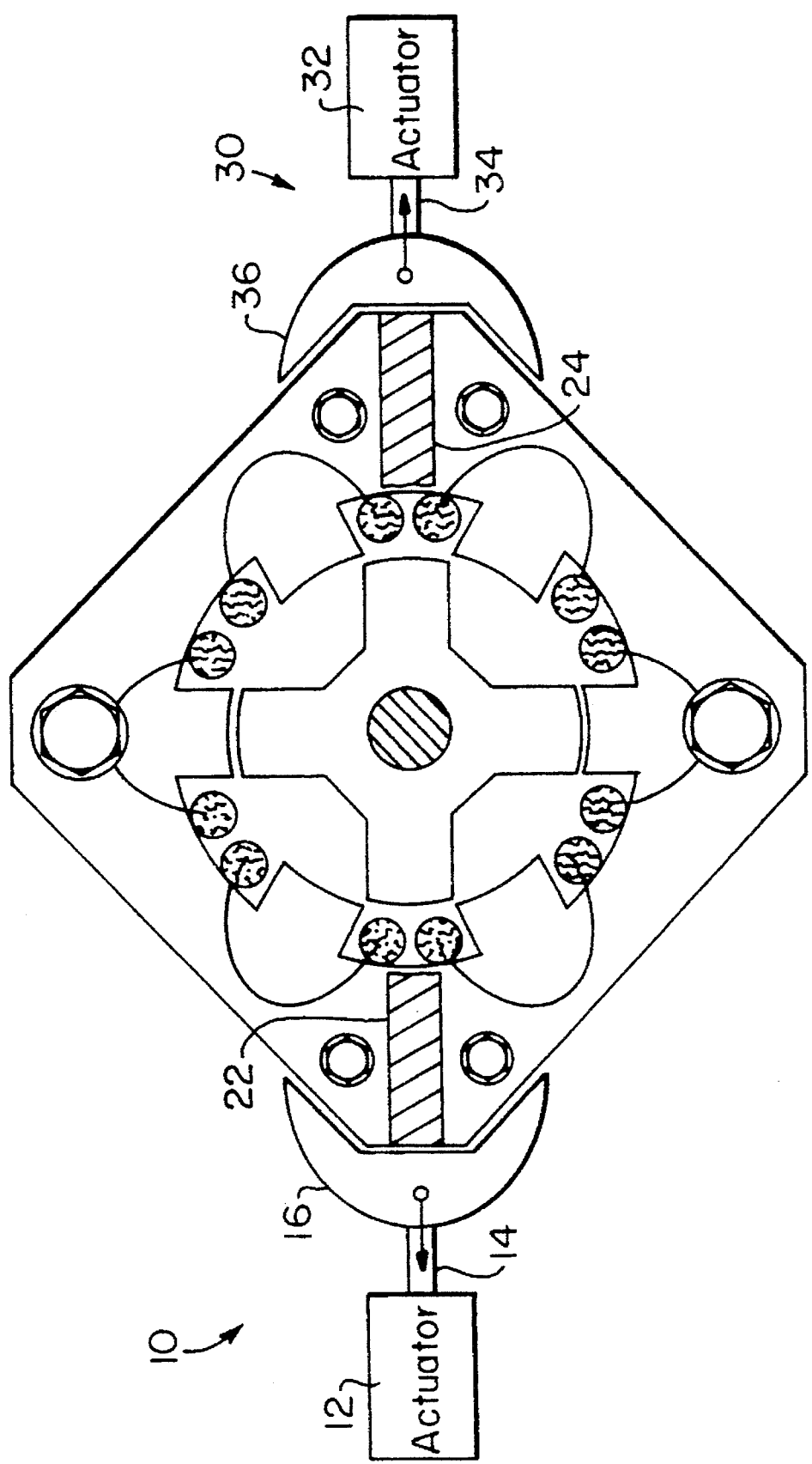
FIG. 3 is a cross-section of a doubly salient stationary permanent magnet motor substantially as shown in FIG. 1, with the addition of an apparatus for field weakening in accordance with the present invention.

FIG. 3 is a cross-sectional view of a salient permanent magnet motor substantially as set forth in co-pending U.S. patent application Ser. No. 07/926,765 now abandoned. In addition, the motor of FIG. 3 incorporates an apparatus for field weakening in accordance with the present invention.

Field weakening is achieved by a pair of flux diversion assemblies 10 and 30 which are operative at the ends of the respective permanent magnets 22 and 24 for providing a by-pass flux path thereabout.

The first flux diversion assembly 10 further comprises an actuator 12 which may be an electro-mechanical solenoid-type actuator, hydraulic, or any other conventional device for imparting axial movement in either a linear, gradual or step-wise manner. Actuator 12 is operatively connected to a steel inset 16 via actuating arm 14.

Likewise, the second flux diversion assembly 30 further comprises an actuator 32 which may be an electro-mechanical solenoid-type actuator or any other conventional device for imparting axial movement. Actuator 32 is operatively connected to a steel inset 36 via actuating arm 34.

The steel insets 16 and 36 preferably conform closely to the corners of the motor in which permanent magnets 22 and 24 are normally mounted so as to minimize the reluctance seen by the magnets 22 and 24 and armature reaction MMF when the steel insets 16 and 36 are in their minimum reluctance (maximum field weakening) position.

Actuators 12 and 32 operate through arms 14 and 34 to allow controlled axial movement of the respective steel insets 16 and 36 toward and away from the respective permanent magnets 22 and 24.

Hence, the flux diversion assemblies 10 and 30 can be operated to drive steel insets 16 and 36 into a first position wherein contact is made on both sides of permanent magnet 22 by inset 16, and similarly, contact is made on both sides of permanent magnet 24 by inset 36. In this first position, insets 16 and 36 each provide a by-pass flux path around the respective permanent magnets 22 and 24. Although the air-like permeability of permanent magnets 22 and 24 blocks the ordinary path of the armature reaction flux through the stator 10 at pole alignment, a by-pass path is provided through insets 16 and 36. As a result, the armature reaction flux is free to flow around the permanent magnets 22 and 24 and their magnetic effect is nullified. In a similar manner, some of the permanent magnet flux is diverted through the shorting by-pass so that the magnet flux which enters the air gap, and thus links the stator windings A-C, is correspondingly reduced. In this first position, when essentially all of the permanent magnet and armature reaction flux is diverted through the bypass, the motor operates as a conventional switched reluctance motor.

Conversely, the flux diversion assemblies 10 and 30 can be operated to retract steel insets 16 and 36 into a second position away from the respective permanent magnets 22 and 24. In this second position, the motor works primarily on the permanent magnet brushless DC motor principle.

Of course, various degrees of flux diversion around the respective permanent magnets 22 and 24 may be achieved by operation of the flux diversion assemblies 10 and 30 to position steel insets 16 and 36 at points between the first and second positions.

In accordance with the method of the present invention, the flux diversion assemblies 10 and 20 are employed when the motor is being run at high speed to drive steel insets 16 and 36 into the first position wherein contact is made on both sides of permanent magnet 22 by inset 16, and similarly, contact is made on both sides of permanent magnet 24 by inset 36. This way, the reluctance component of the flux due to permanent magnets 22 and 24 circulates through the by-pass flux paths through steel insets 16 and 36. The permanent magnetic field is weakened, and the motor operates as a conventional switched reluctance motor.

Conversely, the flux diversion assemblies 10 and 20 are employed when the motor is being run at low speed to retract steel insets 16 and 36 into the second position wherein an air gap separates the insets 16 and 36 from the permanent magnets 22 and 24. This way, the armature reaction component of the flux is inhibited by permanent magnets 22 and 24 since it is unable to flow through the by-pass flux paths through steel insets 16 and 36. The permanent magnetic field is enhanced, and the motor operates as the Stationary Permanent Magnet VRM as set forth in U.S. patent application Ser. No. 07/926,765, now abandoned.

The flux diversion assemblies 10 and 20 may be operated pursuant to the speed of the motor to effect continuous positioning of steel insets 16 and 36 at various points between the first and second positions, thereby effecting various degrees of field weakening in order to maintain constant power.

Hence, by employing the above-described field weakening scheme, a Stationary Permanent Magnet VRM as set forth in co-pending U.S. patent application Ser. No. 07/926,765 can be made to gradually transition from pure permanent magnet operation at low speed to switched reluctance motor operation at high speed while maintaining the output power constant.

The use of field weakening in accordance with the present invention allows a constant power range of 5:1 or more, and such specifications are highly desirable for certain traction applications. Moreover, the device for field weakening according to the present invention may easily and economically be incorporated in any permanent magnet VRM embodiment having permanent magnets in the stator.

Figure 4:
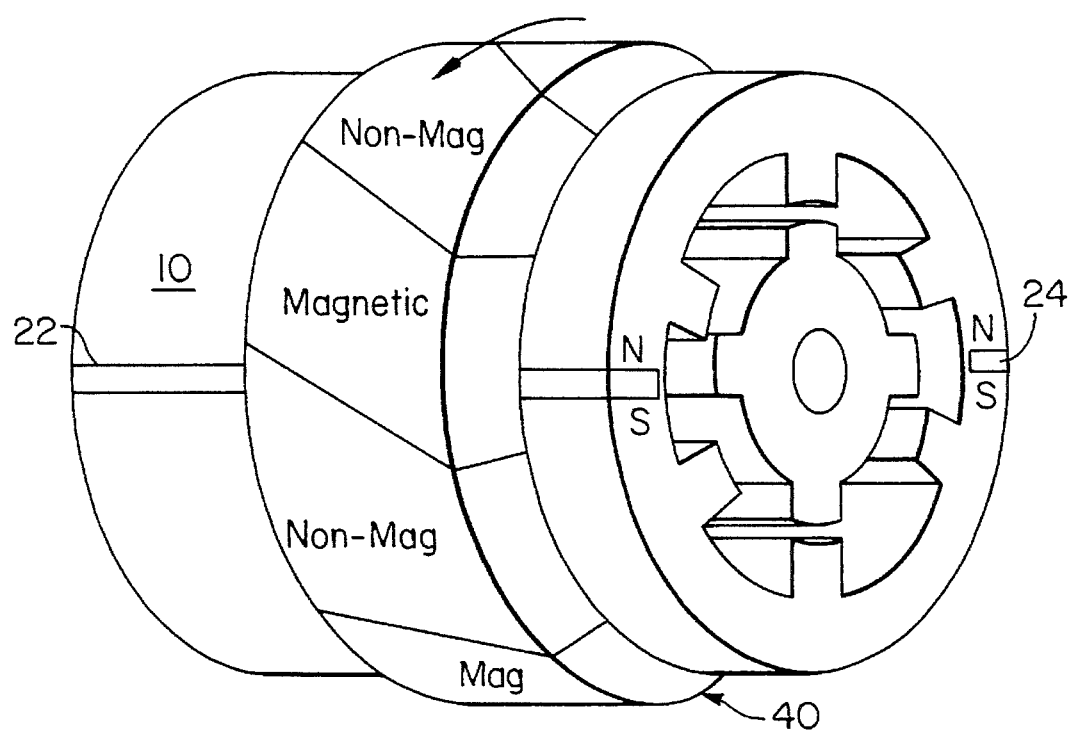
FIG. 4 is a perspective view of an alternative apparatus for field weakening in accordance with the present invention.

FIG. 4 is a perspective view of an alternative apparatus for field weakening in accordance with the present invention which is likewise incorporated in a salient permanent magnet motor substantially as set forth in U.S. patent application Ser. No. 07/926,765, now abandoned.

In the embodiment of FIG. 4, field weakening is achieved by a flux diversion collar 40 which encircles stator 10 and is rotatably mounted thereon. Flux diversion collar 40 is formed from a plurality of alternate magnetic/non-magnetic discrete sections. The flux diversion collar 40 is rotatably driven to allow incremental control of the angular position of collar 40. The discrete magnetic sections of collar 40 may then be selectively positioned to bridge the permanent magnets 22 and 24, thereby establishing a by-pass flux path thereabout. Conversely, the discrete non-magnetic sections of collar 40 may be selectively positioned to bridge the permanent magnets 22 and 24, thereby preventing any by-pass flux. Preferably, the magnetic/non-magnetic discrete sections of collar 40 are formed with a slight helical slant. This way, the axial extent of the by-pass flux path may be varied, and the discrete magnetic sections of collar 40 may be positioned to establish a by-pass path of any size.

The flux diversion collar 40 is driven by an actuator (not shown) which may be an electro-mechanical solenoid-type actuator, hydraulic, or any other conventional device for controlling the angular position. A stepping motor is well-suited for this purpose.

The collar 40 preferably conforms closely to the circumference of the stator 10 so as to minimize the reluctance seen by the magnets 22 and 24 and armature reaction MMF when the discrete non-magnetic sections are in their minimum reluctance (maximum field weakening) positions spanning the permanent magnets 22 and 24.

In accordance with the previously described method of the present invention, the collar 40 is positioned when the motor is being run at high speed to position the discrete magnetic sections of steel over permanent magnet 22 and 24 to establish a by-pass flux path. This way, a component of the flux due to permanent magnets 22 and 24 circulates through the by-pass flux paths through collar 40. The permanent magnet field in the air gap is weakened, and the motor operates as a conventional switched reluctance motor. Conversely, the collar 40 is positioned when the motor is being run at low speed to position the discrete non-magnetic sections steel over permanent magnet 22 and 24 to eliminate the by-pass flux path. This way, the armature reaction component of the flux is inhibited by permanent magnets 22 and 24 since it is unable to flow through the by-pass flux paths. The permanent magnetic field in the air gap is enhanced, and the motor operates as the Stationary Permanent Magnet VRM as set forth in U.S. patent application Ser. No. 07/926,765, now abandoned.

When the sections of collar 40 are formed with a helical slant as shown, the collar 40 may be rotated in accordance with the speed of the motor to effect various degrees of field weakening in order to maintain constant power. It should be noted that it is not necessary to continuously rotate the collar 40 to effect field weakening. With a helical slant as shown in FIG. 4, it is estimated that a full range of field weakening may be achieved by a 30° angular adjustment.

Figure 5:
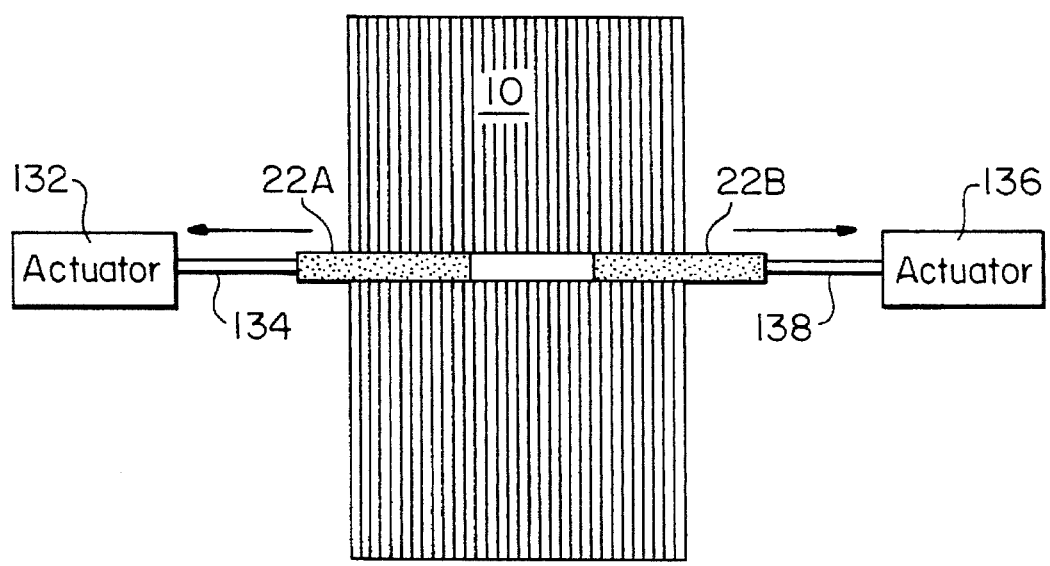
FIG. 5 is a cross-sectional view of a third alternative apparatus for field weakening in accordance with the present invention.

FIG. 5 is a cross-sectional view of yet another alternative apparatus for field weakening in accordance with the present invention. The embodiment of FIG. 5 is likewise incorporated in a salient permanent magnet motor substantially as set forth in co-pending U.S. patent application Ser. No. 07/926,765.

In the embodiment of FIG. 5, field weakening is achieved by moving the permanent magnets 22 and 24 themselves. Preferably, each permanent magnet further comprises two separable sections, for example, permanent magnet 22 comprises sections 22A and 22B as shown. The axially stacked laminations of stator 10 are formed to allow the sections of permanent magnets 22 and 24 to slide apart and out of stator 10 in the axial direction indicated in FIG. 5.

An actuator 132 is provided to insert and retract one section 22A of permanent magnet 22, and a second actuator 136 is provided to insert and retract the other section 22B. Both actuators 132 and 136 may be electro-mechanical solenoid-type actuators or any other conventional device for imparting axial movement. Actuator 132 is operatively connected to permanent magnet section 22A via actuating arm 134, and actuator 136 is operatively connected to permanent magnet section 22B via actuating arm 138.

Actuators 132 and 136 operate through arms 134 and 138 to allow controlled axial movement of the respective permanent magnet sections 22A and 22B into and out from the stacked laminations of the stator 10.

An identical arrangement is provided to operate permanent magnet sections 24A and 24B (not shown).

Hence, the actuators 132 and 136 can be operated to drive permanent magnet sections 22A and 22B into a first fully-inserted position when the motor is being run at low speed, and the same is done to permanent magnet sections 24A and 24B (not shown), to thereby increase the reluctance torque component of magnets 22 and 24. The permanent magnet field in the air gap is enhanced, and the motor operates as the Stationary Permanent Magnet VRM as set forth in co-pending U.S. patent application Ser. No. 07/926,765.

Conversely, the actuators 132 and 136 can be operated to extract permanent magnet sections 22A and 22B to a second position when the motor is being run at high speed, and the same is done to permanent magnet sections 24A and 24B (not shown), to thereby reduce the reaction torque component of magnets 22 and 24.

The actuators 132 and 136 may be operated in accordance with the speed of the motor to effect various degrees of reluctance torque in order to maintain constant power.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

We claim:

1. A permanent magnet motor comprising:

a rotor, said rotor further comprising,
   a plurality of salient rotor poles spaced at equal angular intervals around a central axis;
a stator for exciting said rotor to move, said stator further comprising,
   a plurality of salient stator poles spaced at equal angular intervals around said central axis, said stator poles being arranged with respect to said rotor poles to provide a constant air-gap reluctance during rotation of said rotor within said stator, and
   a plurality of permanent magnets shaped in parallelepipeds and arranged on diametrically opposite sides of said stator to serve as a source of flux for magnetizing the motor; and
a flux by-pass collar encircling said stator and rotatable thereabout to provide a controlled bypass flux path around said permanent magnets, said flux by-pass collar further comprising a plurality of non-magnetic sections each angularly corresponding to one of said permanent magnets;
whereby the flux by-pass collar may be rotated in accordance with torque requirements to cause each of said magnetic sections to bridge a corresponding permanent magnet, thereby promoting a flow of flux around said one of said permanent magnets, and thereby reducing an air gap magnetic field of said one of said permanent magnets, and the flux by-pass collar may be rotated in accordance with the torque requirements to displace each of said magnetic sections from the corresponding permanent magnet, thereby eliminating a flow of flux around said one of said permanent magnets and reducing the air gap magnetic field of said one of said permanent magnets.

2. The permanent magnet motor of claim 1, wherein said plurality of permanent magnets further comprises a first permanent magnet and a second permanent magnet shaped as elongate parallelepipeds and parallely spaced on opposing sides of said control axis, and said flux by-pass collar further comprises a first non-magnetic section angularly corresponding to said first permanent magnet, a second non-magnetic section angularly corresponding to said second permanent magnet, and a pair of magnetic sections integral to said non-magnetic sections.

3. The permanent magnet motor of claim 1, wherein the non-magnetic sections of said flux by-pass collar are formed with a helical slant.

4. The permanent magnet motor of claim 2, wherein said plurality of salient stator poles further comprises a multiple of six stator poles evenly spaced at angular intervals equal to a multiple of $\pi/3$ radians.

5. The permanent magnet motor of claim 4, wherein said stator poles have a pole arc equal to a multiple of $\pi/6$ radians.

6. The permanent magnet motor of claim 5, wherein said plurality of salient rotor poles further comprises a multiple of four rotor poles evenly spaced at angular intervals equal to a multiple of $\pi/2$ radians.

7. The permanent magnet motor of claim 6, wherein said rotor poles have a pole arc equal to a multiple of $\pi/6$ radians.

* * * * *